(12) United States Patent
Shoykhet et al.

(10) Patent No.: US 9,030,208 B2
(45) Date of Patent: May 12, 2015

(54) USING PULSED DC TO DETECT CONNECTOR MATING AND UNMATING

(71) Applicant: Apple Inc., Cupertino, CA (US)

(72) Inventors: Eugene L. Shoykhet, San Jose, CA (US); Brian C. Menzel, Sunnyvale, CA (US); Yehonatan Perez, Menlo Park, CA (US); Joseph R. Fisher, Jr., San Jose, CA (US); Jahan C. Minoo, San Jose, CA (US); Kevin M. Keeler, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 130 days.

(21) Appl. No.: 13/762,224

(22) Filed: Feb. 7, 2013

(65) Prior Publication Data
US 2014/0218045 A1    Aug. 7, 2014

(51) Int. Cl.
*G06F 13/40* (2006.01)

(52) U.S. Cl.
CPC .................................. *G06F 13/4081* (2013.01)

(58) Field of Classification Search
None
See application file for complete search history.

(56) References Cited

U.S. PATENT DOCUMENTS

| 4,241,373 | A  | * | 12/1980 | Mara et al. ..................... 361/92 |
| 7,928,738 | B2 | * | 4/2011 | Sip ................................ 324/538 |
| 8,266,335 | B2 | * | 9/2012 | Kitano et al. .................... 710/15 |
| 8,693,218 | B2 | * | 4/2014 | Chueh et al. ................ 363/21.15 |
| 8,786,132 | B2 | * | 7/2014 | Morita et al. ................... 307/66 |
| 2007/0103168 | A1 | * | 5/2007 | Batten et al. ................. 324/527 |
| 2009/0295396 | A1 | * | 12/2009 | Kouchi et al. ................ 324/426 |

* cited by examiner

*Primary Examiner* — Tung X Nguyen
*Assistant Examiner* — Alesa Allgood
(74) *Attorney, Agent, or Firm* — Kilpatrick Townsend & Stockton LLP

(57) ABSTRACT

Techniques for detecting mating and un-mating of a first connector with a second connector include providing a pulsed voltage signal at a contact of the second connector and measuring a rate of rise of voltage at the contact. If the measured voltage at the contact exceeds a threshold voltage during the time the pulsed voltage signal is applied, then it is concluded that the first connector is not present and not mated with the second connector. If the measured voltage is lower than or equal to the threshold voltage during the time of application of the voltage pulse, it is concluded that the first connector is present and mated with the second connector.

17 Claims, 11 Drawing Sheets

| ACC1 | Data A+ | Data A- | P_IN | P_IN | Data B- | Data B+ | ACC2 |
|------|---------|---------|------|------|---------|---------|------|
| 206(1) | 206(2) | 206(3) | 206(4) | 206(5) | 206(6) | 206(7) | 206(8) |

Fig. 2D

| GND | Data A+ | Data A- | ACC1 | P_IN | Data B- | Data B+ | ACC2 |
|-----|---------|---------|------|------|---------|---------|------|
| 206(1) | 206(2) | 206(3) | 206(4) | 206(5) | 206(6) | 206(7) | 206(8) |

Fig. 2E

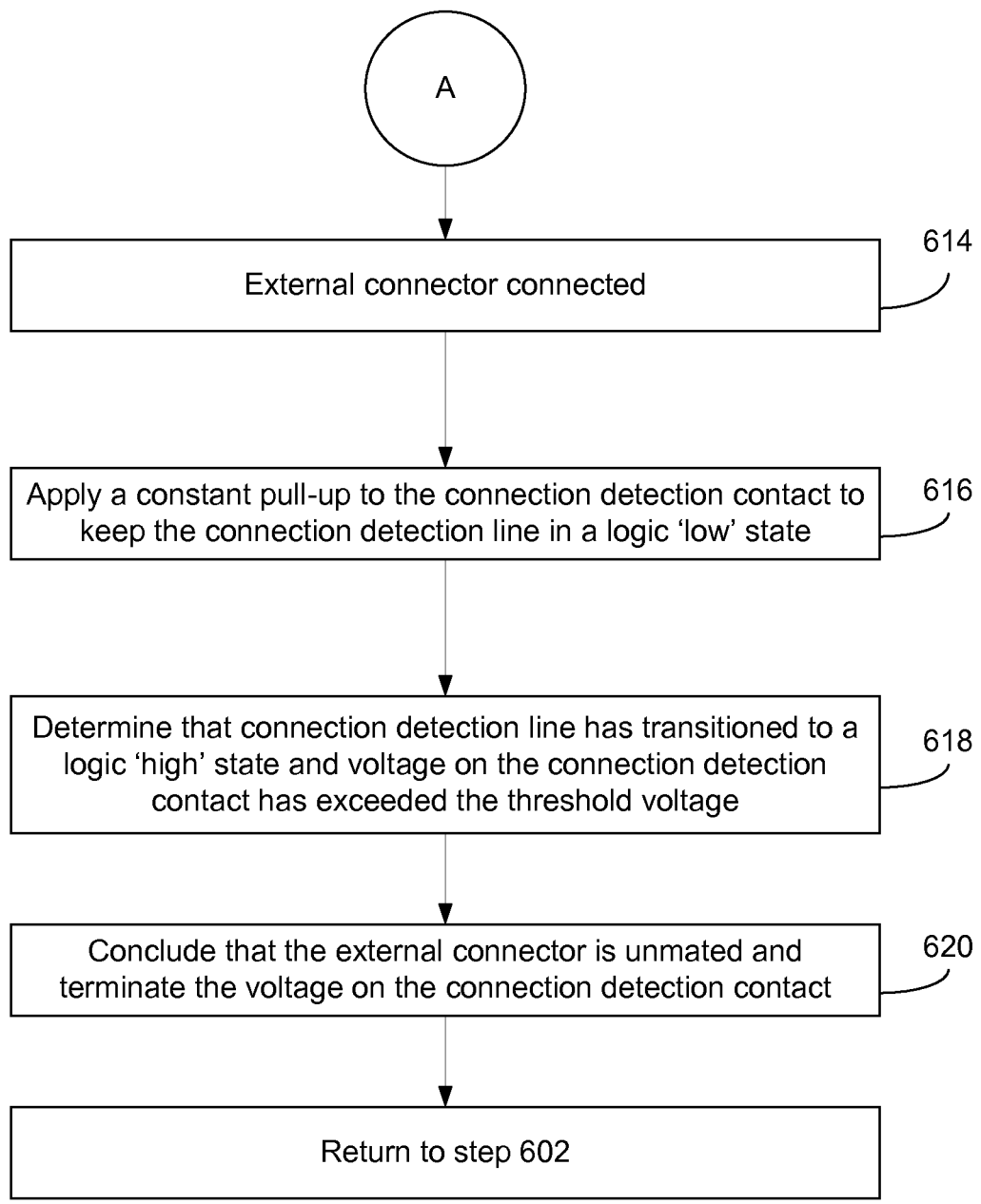
Fig. 6 contd...

USING PULSED DC TO DETECT CONNECTOR MATING AND UNMATING

BACKGROUND

Connectors are ubiquitous and are used in variety of applications for coupling two electronic devices. Most connectors usually have some sort of contacts that facilitate transmission of signals between the devices connected using the connectors. Connectors are often the primary means of connecting two devices, e.g., a host device and an accessory device.

Conventionally, mechanical means such as a latch have been employed to detect physical mating of one connector to another. However, such mechanical means of detecting physical mating of connectors tend to degrade over time due to general wear and tear making them unreliable over a longer period of time. Also, such mechanical means has a tendency to break or rupture making the connector potentially unusable. Also, in instances where a quick connect/disconnect is desired, the mechanical approach is too slow.

In addition, it has been known that having a constant bias voltage present on any electrical contact increases the chances of dendrite growth and corrosion of the contacts.

BRIEF DESCRIPTION OF THE DRAWINGS

FIGS. 2D and 2E are diagrams illustrating a pinout arrangement of a receptacle connector according to two different embodiments of the invention configured to mate with plug connectors 100 and 101, respectively, as shown in FIGS. 1D and 1E.

DETAILED DESCRIPTION

Figure 1A:
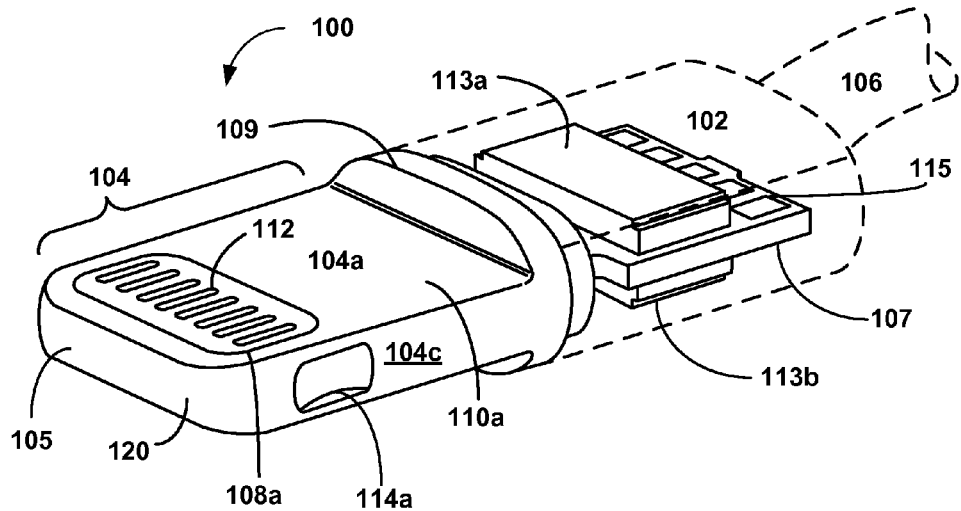
FIG. 1A illustrates a plug connector according to an embodiment of the present invention.

Embodiments of the present invention generally relates to connectors and devices that embody these connectors. Two devices may be coupled to each other using connectors. For example, a host device may be connected to an accessory using connectors that are present on both the accessory and the host device. In many instances, where a hard-wired connection is used to connect two devices, there is always some sort of connector that is used to convey the signals between such devices. For example, a host device may be a personal computer, a PDA, a tablet computer, a portable computing device, etc. and an accessory may be some device that is designed to operate with the host device. Examples of accessories include but are not limited to speaker docs, keyboards, cables, cameras, power supplies, etc. In general, an accessory can be any device that is designed to work with a host device.

In many instances, the accessory device may exchange electrical signals such as power, data, etc. with the host device. It is common knowledge in the industry that in order to ensure reliability of the communication between two devices, a good solid connection between the devices is desirable. A loose or unreliable connection often leads to communication failure and in some instances may cause damage to the host device and/or the accessory. In a particular instance such as when an accessory provides power to the host device, it may be beneficial to ensure that a proper mechanical connection between the connectors of the two devices exists before enabling the power. This will ensure that power is only turned on whenever a solid/robust mechanical coupling exists between the two connectors thus reducing the possibility of arcing and other power related hazards.

As described above, conventionally, mechanical techniques have been used to ensure good physical connection between two connectors. For example, using a notch-latch-type mechanism has been the most prevalent in the industry. One of the biggest issues with mechanical techniques is that there is no feedback provided to either the host device or the accessory to ensure that the connectors are physically mated with each other. Such techniques rely on the user's ability to ensure a good physical connection with between the connectors. Thus, conventionally, as soon as a connector is mated with another connector and the mechanical means engages to latch the connectors' together, the electrical signals are turned on under the assumption that the physical connection is adequate.

However, in many instances, the connection may not be adequate; the mechanical means may malfunction during operation, etc. which may result in the problems described above. An electrical means of detecting connection between two devices solves many of the issues associated with the traditional means for connection detection.

Embodiments of the present invention provide techniques for detecting connection of an accessory device to a host device. Specifically, one embodiment of the present invention provides a technique for detecting connection of a host device to an accessory device without having to apply a constant bias at a connection detection contact of the host device.

In a particular embodiment, a method for detecting connection of a host device to an accessory device is disclosed. The method includes the host device providing a voltage pulse at a first contact of a first connector of the host device. The voltage pulse is characterized by an ON time and an OFF time. The host device then measures a first voltage at the first contact and determines that the first voltage is lower than or equal to a threshold voltage during the ON time. Based on this determination, the host device concludes that a second connector of an accessory device is connected to the first connector and thereafter the host device communicates with the accessory device.

In another embodiment, a host device is disclosed. The host device includes a first connector that has a plurality of contacts that are configured to mate with a second connector of an accessory device. The host device also includes a processor coupled to the first connector and detection circuitry coupled to the processor and the first connector. The detection circuitry in conjunction with the processor can output a voltage pulse over a first contact of the first connector. The voltage pulse has amplitude and a duty cycle. The detection circuitry can measure a first voltage at the first contact during a time when the voltage pulse is outputted over the first contact. If the first voltage exceeds a threshold voltage during the time when the voltage pulse is outputted over the first contact, the host device can conclude that the second connector is not connected to the first connector and if the first voltage is lower than or equal to the threshold voltage during the time when the voltage pulse is outputted over the first contact, the host device can conclude that the second connector is connected to the first connector.

FIG. 1A illustrates a plug connector 100 (or accessory-side connector 100) according to an embodiment of the present invention. Plug connector 100 is exemplary and is used herein to explain the various embodiments of the present invention. One skilled in the art will realize that many other forms and types of connectors other than plug connector 100 can be used and that techniques described herein will apply to any plug connector that has the characteristics of plug connector 100. In some embodiments, plug connector 100 may be associated with an accessory that can be coupled to a host device.

Plug connector 100 includes a body 102 and a tab portion 104. A cable 106 is attached to body 102 and tab portion 104 and extends longitudinally away from body 102 in a direction parallel to the length of the connector 100. Tab 104 is sized to be inserted into a corresponding receptacle connector during a mating event and includes a first contact region 108a formed on a first major surface 104a and a second contact region 108b (not shown in FIG. 1A) formed at a second major surface 104b (also not shown in FIG. 1A) opposite surface 104a. Surfaces 104a, 104b extend from a distal tip of the tab to a spine 109 that, when tab 104 is inserted into a corresponding receptacle connector, abuts a housing of the receptacle connector or portable electronic device the receptacle connector is incorporated in. Tab 104 also includes first and second opposing side surfaces 104c, 104d (not shown) that extend between the first and second major surfaces 104a, 104b. In one particular embodiment, tab 104 is about 6.6 mm wide, about 1.5 mm thick and has an insertion depth (the distance from the tip of tab 104 to spine 109) of about 7.9 mm.

A plurality of contacts 112 can be formed in each of contact regions 108a and 108b such that, when tab 104 is inserted into a corresponding receptacle connector, contacts 112 in regions 108a or 108b are electrically coupled to corresponding contacts in the receptacle connector. In some embodiments, contacts 112 are self-cleaning wiping contacts that, after initially coming into contact with a receptacle connector contact during a mating event, slide further past the receptacle connector contact with a wiping motion before reaching a final, desired contact position.

As an example, in one embodiment an ID module is embodied within an IC operatively coupled to the contacts of connector 100. The ID module can be programmed with identification and configuration information about the connector and/or its associated accessory/adapter that can be communicated to a host device during a mating event. As another example, an authentication module programmed to perform an authentication routine, for example a public key encryption routine, with circuitry on the host device can be embodied within an IC operatively coupled to connector 100. The ID module and authentication module can be embodied within the same IC or within different ICs. As still another example, a current regulator can be embodied within one of IC's 113a or 113b. The current regulator can be operatively coupled to contacts that are able to deliver power to charge a battery in the portable electronic device and regulate current delivered over those contacts to ensure a constant current regardless of input voltage and even when the input voltage varies in a transitory manner. The function of the IC's is further described below in reference to FIG. 4.

Bonding pads 115 can also be formed within body 102 near the end of PCB 107. Each bonding pad can be connected to a contact or contact pair within regions 108a and 108b. Wires (not shown) can then be soldered to the bonding pads to provide an electrical connection from the contacts to circuitry within an accessory associated with connector 100. In some embodiments, however, bonding pads are not necessary and instead all electrical connections between the contacts and components of connector 100 and other circuitry within an accessory are made through traces on a PCB that the circuitry is coupled to and/or by interconnects between multiple PCBs within the accessory.

The structure and shape of tab 104 is defined by a ground ring 105 that can be made from stainless steel or another hard conductive material. Connector 100 includes retention features 114a, 114b (not shown) formed as curved pockets in the sides of ground ring 105 that double as ground contacts. Body 102 is shown in FIG. 1A in transparent form (via dotted lines) so that certain components inside the body are visible. As shown, within body 102 is a printed circuit board (PCB) 107 that extends into ground ring 105 between contact regions 108a and 108b towards the distal tip of connector 100. One or more integrated circuits (ICs), such as Application Specific Integrated Circuit (ASIC) chips 113a and 113b, can be operatively coupled to PCB 107 to provide information regarding connector 100 and/or to perform specific functions, such as authentication, identification, contact configuration and current or power regulation.

Figure 1B:
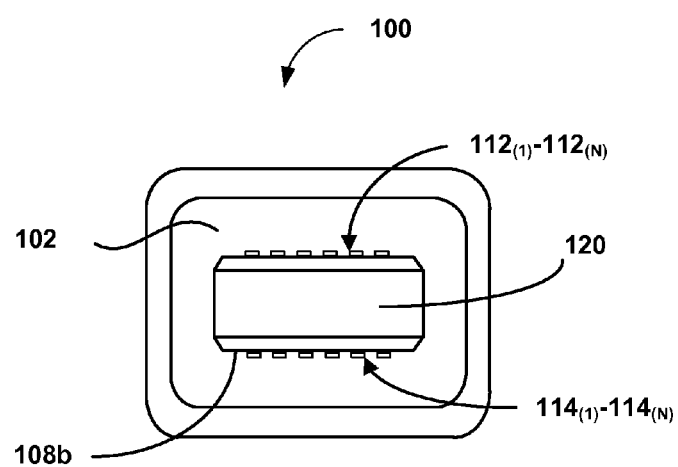
FIG. 1B is a front view of the plug connector according to an embodiment of the present invention.

FIG. 1B illustrates a front view of plug connector 100. The front view illustrates a cap 120. Cap 120 can be made from a metal or other conductive material and can extend from the distal tip of connector 100 along the side of the connector towards body 102 either fully or partially surrounding contacts 112 formed in contact regions 108a and 108b in the X and Y directions. In some embodiments, cap 120 can be grounded in order to minimize interference that may otherwise occur on contacts 112 of connector 100 and can thus be referred to as a ground ring, e.g., ground ring 105 illustrated in FIG. 1A. Contacts $112_{(1)}$-$112_{(N)}$ can be positioned within contact region 108a and additional contacts $114_{(1)}$-$114_{(N)}$ can be positioned within region 108b on the opposing surface of tab 104. In some embodiments, N can be between 2 and 8. Contacts $112_{(1)}$ ... $112_{(N)}$ and $114_{(1)}$ ... $114_{(N)}$ can be used to carry a wide variety of signals including digital signals and analog signals as well as power and ground.

Figure 1C:
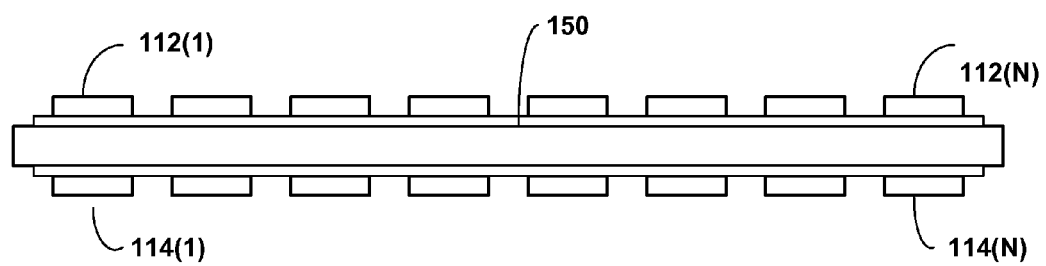
FIG. 1C is cross-sectional view of the plug connector according to an embodiment of the present invention.

FIG. 1C illustrates a cross-sectional schematic view of contacts 112, 114 and positioning of the contacts. Contacts 112, 114 can be mounted on either side of a PCB 150 as illustrated. In some embodiments, opposing contacts, e.g., $112_{(1)}$ and $114_{(1)}$ may be shorted or electrically connected to each other through PCB 150, e.g., using a via, to create an in-line connector design. In other embodiments, all contacts may be independent with no connections between any of the contacts or the contacts may have other connections schemes between them. In the instance where each contacts is independent and not connected to any other contact, a different receptacle connector, e.g., connector 250 of FIG. 2C, may be used. Contacts 112, 114 can be made from a copper, nickel, brass, a metal alloy or any other appropriate conductive material. Spacing is consistent between each of the contacts on the front and back sides and between the contacts and the edges of the connector providing 180 degree symmetry so that plug connector 100 can be inserted into a corresponding receptacle connector in either of two orientations.

When connector 100 is properly engaged with a receptacle connector, each of contacts $112_{(1)}$-$112_{(N)}$ or $114_{(1)}$-$114_{(N)}$ is in electrical connection with a corresponding contact of the receptacle connector.

Figure 1D:
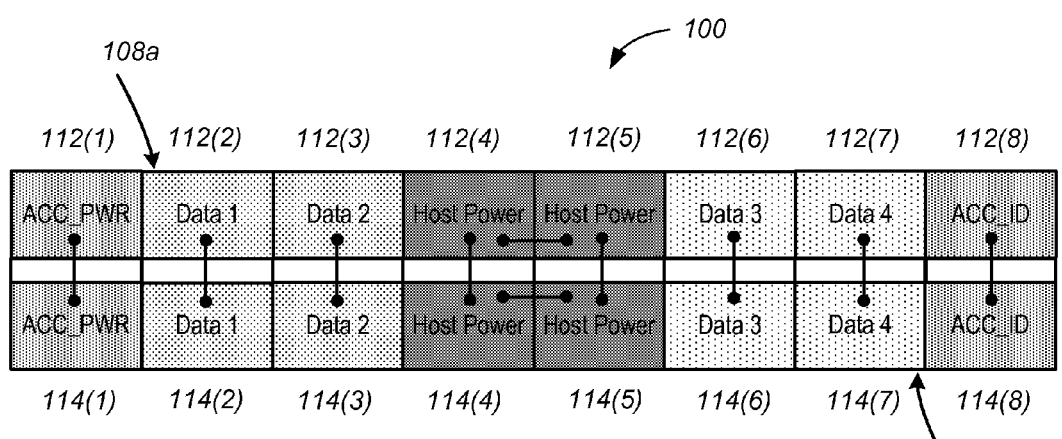
FIG. 1D is a pin-out of a plug connector according to an embodiment of the present invention.

FIG. 1D illustrates a pin-out configuration for connector 100 according one particular embodiment of the present invention as described in connection with FIG. 1C above.

The pin-out shown in FIG. 1D includes four contacts 112(4), 112(5), 114(4), and 114(5) (Host Power) that are electrically coupled together to function as a single contact dedicated to carrying power to a connected host device. Connector 100 may also include accessory ID contacts 112(8) and 114(8) (ACC_ID); accessory power contacts 112(1) and 114(1) (ACC_PWR); and eight data contacts arranged in four pairs. The four pairs of data contacts may be (a) 112(2) and 112(3), (b) 112(6) and 112(7), (c) 114(2) and 114(3), and (d) 114(6) and 114(7). Host power contacts 112(4) and 112(5), or 114(4) and 114(5) carry power from an accessory associated with connector 100 to a host device that is coupled to the accessory via connector 100. The host power contacts can be sized to handle any reasonable power requirement for an electronic device or host device, and for example, can be designed to carry between 3-20 Volts from an accessory to charge the host device connected to connector 100. In this embodiment, host power contacts 112(4), 112(5), 114(4), and 114(5) are positioned in the center of contact regions 108a, 108b to improve signal integrity by keeping power as far away as possible from the sides of ground ring 105.

Accessory power contacts 112(1) and 114(1) can be used for an accessory power signal that provides power from the host device to an accessory. The accessory power signal is typically a lower voltage signal than the host power signal received over host power contacts 112(4) and 112(5), for example, 3.3 volts as compared to 5 volts or higher. The accessory ID contacts provide a communication channel that enables the host device to authenticate the accessory and enable the accessory to communicate information to the host device about the accessory's capabilities as described in more detail below.

The four pairs of data contacts (a) 112(2) and 112(3), (b) 112(6) and 112(7), (c) 114(2) and 114(3), and (d) 114(6) and 114(7) may be used to enable communication between the host and accessory using one or more of several different communication protocols. For example, data contacts 112(2) and 112(3) are positioned adjacent to and on one side of the power contacts, while data contacts 112(6) and 112(7) are positioned adjacent to but on the other side of the power contacts. A similar arrangement of contacts can be seen for contacts 114 on the other surface of the PCB. The accessory power and accessory ID contacts are positioned at each end of the connector. The data contacts can be high speed data contacts that operate at rate that is two or three orders of magnitude faster than any signals sent over the accessory ID contact which makes the accessory ID signal look essentially like a DC signal to the high speed data lines. Thus, positioning the data contacts between the power contacts and the ID contact improves signal integrity by sandwiching the data contacts between contacts designated for DC signals or essentially DC signals.

Figure 1E:
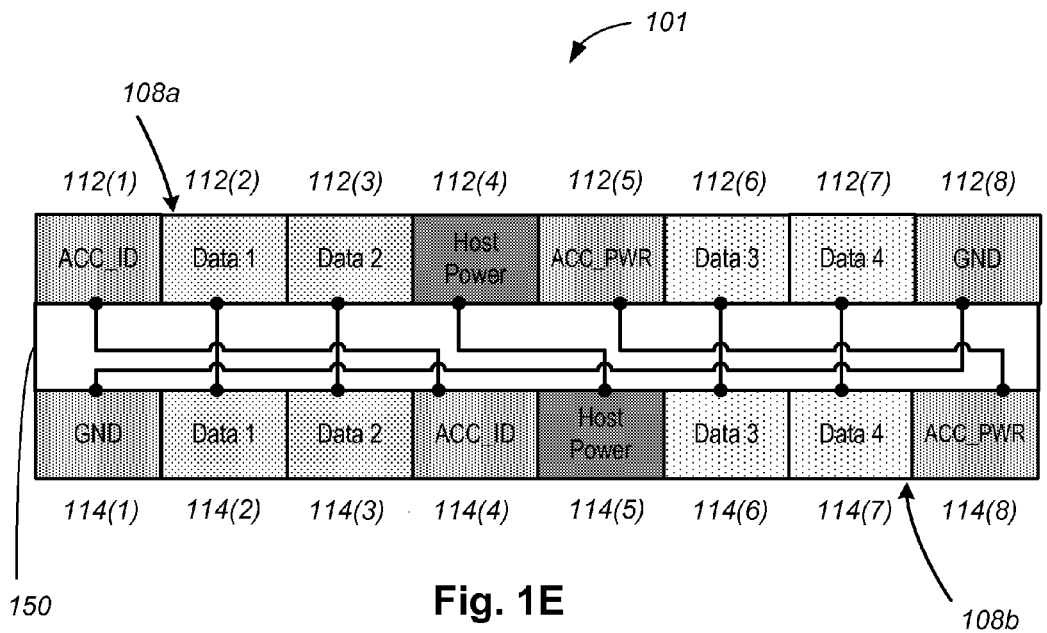
FIG. 1E is a pin-out of a plug connector according to another embodiment of the present invention.

FIG. 1E illustrates a pin-out configuration for a connector 101 according another particular embodiment of the present invention.

Connector 101 is also a reversible connector just like connector 100. In other words, based on the orientation in which connector 101 is mated with a corresponding connector of a host device, either the contacts on the surface 108a or 108b are in physical and electrical contact with the contacts in the corresponding connector of the host device. As illustrated in FIG. 1E, connector 101 may have eight contacts arranged on an upper surface of a PCB 150 and eight contacts arranged on a lower surface of PCB 150.

Connector 101 includes two contacts 112(1) and 114(4) that can function as accessory ID contacts to carry the identification signals between the accessory and the portable electronic device. Contacts 112(1) and 114(4) are electrically connected to each other as illustrated in FIG. 1E. Connector 101 can have four pairs of data contacts, (a) 112(2) and 112(3), (b) 112(6) and 112(7), (c) 114(2) and 114(3), and (d) 114(6) and 114(7). In this particular embodiment, opposing data contacts, e.g., 112(2) and 114(2) are electrically connected to each other via PCB 150 as illustrated in FIG. 1E. Connector 101 may further include host power contacts 112(4) or 114(5) that may be electrically connected to each other. Host power contacts 112(4) or 114(5) can carry power to the host device that is mated with connector 101. For example, plug connector 101 may be part of a power supply system designed to provide power to the host device. In this instance, either contact 112(4) or 114(5) may carry power from the power supply to the host device, e.g., to charge a battery in the host device.

Connector 101 may further include accessory power contacts 112(5) and 114(8) that may be electrically connected to each other, e.g., via PCB 150. Accessory power contacts carry power from the host device to a connected accessory. For example, in some instances, an accessory connected to the host device may not be self-powered and may derive its power from the host device. In this instance, the host device can supply power to the accessory over either of the accessory contacts, depending on the orientation of connector 101 with respect to a corresponding connector of the host device. Connector 101 may further include two ground contacts 112(8) and 114(1) electrically connected to each other. The ground contacts provide a ground path for connector 101.

Figure 2A:
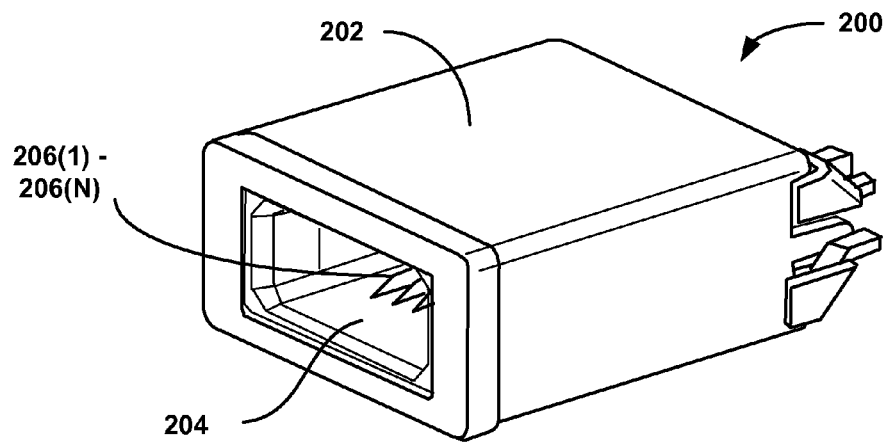
FIG. 2A illustrates a receptacle connector according to an embodiment of the present invention.

FIG. 2A illustrates a receptacle connector 200 according to an embodiment of the present invention. Receptacle connector 200 may be included in a host device. Receptacle connector 200 includes a housing 202 that defines a cavity 204 and houses N contacts $206_{(1)}$-$206_{(N)}$ within the cavity. In operation, a connector plug, such as plug connector 100 (or connector 101) can be inserted into cavity 204 to electrically couple the contacts $112_{(1)}$-$112_{(N)}$ or $114_{(1)}$-$114_{(N)}$ to respective contacts $206_{(1)}$-$206_{(N)}$. Each of the receptacle connector contacts $206_{(1)}$-$206_{(N)}$ electrically connects its respective plug contact to circuitry associated with the electrical/host device in which receptacle connector 200 is housed. For example, receptacle connector 200 can be part of a portable media device and electronic circuitry associated with the media device is electrically connected to receptacle 200 by soldering tips of contacts $206_{(1)}$-$206_{(N)}$ that extend outside housing 202 to a multilayer board such as a printed circuit board (PCB) within the portable media device. Note that connector 200 includes contacts on just a single side so it can be made thinner. In other embodiments, connector 200 may have contacts on each side.

Figure 2B:
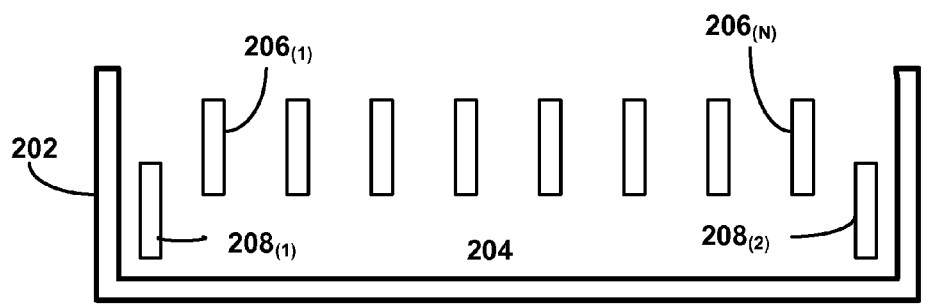
FIG. 2B cross-sectional view of the receptacle connector according to an embodiment of the present invention.

FIG. 2B illustrates a cross section view of receptacle connector 200 according to an embodiment of the present invention. As illustrated, in some embodiments, Additional contacts $208_{(1)}$ and $208_{(2)}$ are located at either ends of contacts $206_{(1)}$-$206_{(N)}$. Contacts $208_{(1)}$ and $208_{(2)}$ may be used to detect whether the plug connector is fully inserted into cavity 204 or inserted to a point where contacts 112 (or 114) of plug connector 100 (or connector 101) are physically coupled to contacts 206 of receptacle connector 200. In some embodiments, contacts $208_{(1)}$ and $208_{(2)}$ can also be used to detect whether the plug connector has been disconnected from the receptacle connector. In some embodiments, contacts 208 can make contact with cap 120 of plug connector 100 (or 101) when the plug connector is inserted beyond a certain distance within cavity 204. In some embodiments, contacts 208 are placed such that they will make contact with the ground ring of plug connector only when contacts 112 make a solid physical connection with contacts 206. In some embodiments, when contacts 208 connect to the ground ring of the plug connector, a signal may be generated indicating the connection.

In some embodiments, the receptacle connector may have contacts $206_{(1)-(N)}$ only on a single side inside cavity 204 as described above. In a particular embodiment, receptacle connector 250 may have eight (8) contacts $206_{(1)}$-$206_{(8)}$ as illustrated in FIG. 2D. Some or all of these contacts may be configured to perform one of several functions depending on the signals available on a plug connector. Plug connector 100 (or connector 101) may be associated any one of several accessories that may be designed to work with a host device that is associated with receptacle connector 250. For example, plug connector 100 (or connector 101) may be associated with an audio only accessory in which case the signals available on the contacts, e.g., $106_{(1)}$-$106_{(N)}$, of the plug connector may include audio and related signals. In other instances, where plug connector 100 (or connector 101) is associated with a more complex accessory such as video accessory, the contacts of plug connector may carry audio, video, and related signals. Thus, in order to enable receptacle connector 250 to be operable with various different types of signal, contacts $206_{(1)-(8)}$ of receptacle connector 250 can be made configurable based on the signals available from a plug connector 100 (or connector 101).

Figure 2C:
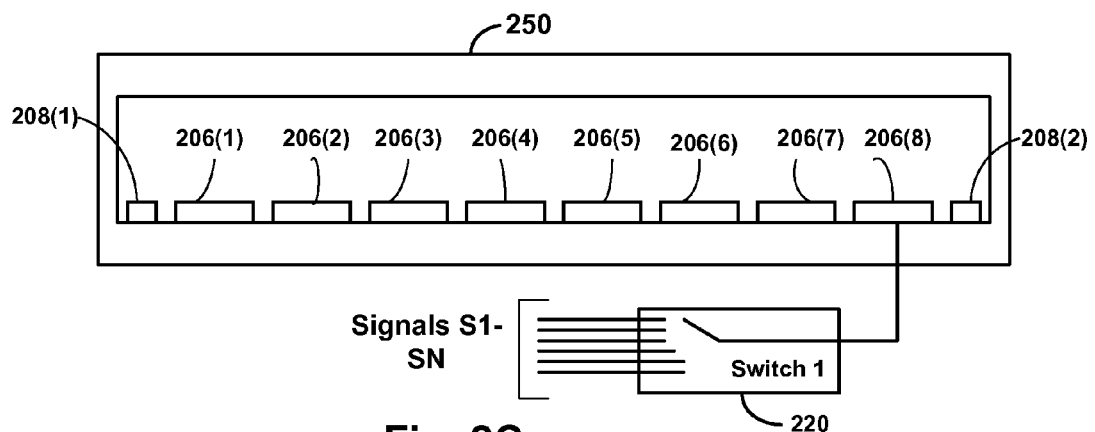
FIG. 2C is a cross-sectional view of a receptacle connector having eight signal contacts and two connection detection contacts according to an embodiment of the present invention.

In the particular embodiment illustrated in FIG. 2C, receptacle connector 250 has eight contacts $206_{(1)-(8)}$ in addition to two connection detection contacts $208_{(1)}$ and $208_{(2)}$. The operation of the connection detection contacts $208_{(1)}$ and $208_{(2)}$ is described above in relation to FIG. 2B. Some or all of contacts $206_{(1)-(8)}$ may have an associated switch that can configure the contact to carry one of many possible signals. However, for ease of explanation only one switch 220 coupled to contact $206_{(8)}$ is illustrated in FIG. 2C. It is to be noted that some or all other contacts from among contacts $206_{(1)}$-$206_{(8)}$ may each have a similar switch 220 coupled to it. As illustrated in FIG. 2C, switch 220 can be used to configure contact $206_{(8)}$ to carry any one of signals $S_1$-$S_n$ depending on the configuration of the plug connector.

In a particular embodiment, contact $206_{(1)}$ may be an identification bus pin (ACC_ID) and can be configured to communicate a command operable to cause an accessory to perform a function and provide a response to a host device unique to the command. The command may be any one or more of a variety of commands, including a request to identify a connector pin and select one of a plurality of communication protocols for communicating over the identified connector pin, a request to set a state of the accessory, and a request to get a state of the accessory. Contact $206_{(1)}$ may also or alternatively be configured to communicate power from the host device to the accessory (e.g., ACC_PWR). For example, contact $206_{(1)}$ may be coupled to a positive (or negative) voltage source within the host device so as to generate a voltage differential with another contact (such as a ground contact which may be, e.g., contact $206_{(8)}$).

In a particular embodiment, contacts $206_{(2)}$ and $206_{(3)}$ may form a first pair of data contact (DP1/DN1). The data contacts may be configured to carry one or more of a variety of signals, such as (a) USB differential data signals, (b) non-USB differential data signal, (c) UART transmit signal, (d) UART receive signal, (e) digital debug input/output signals, (f) a debug clock signal, (g) audio signals, (h) video signals, etc.

In a particular embodiment, contact $206_{(4)}$ may carry incoming power (e.g., a positive voltage relative to another contact such as a ground pin) to the host device (e.g., from a power source in or coupled to the accessory) with which receptacle connector 200 is associated. Contact $206_{(5)}$ may also function as an identification bus pin (ACC_ID) similar to contact $206_{(1)}$ described above. Contact $206_{(5)}$ may also or alternatively be configured to communicate power from the host device to the accessory (e.g., ACC_PWR), depending on the orientation of a connected plug connector 100 (or connector 101) with respect to receptacle connector 200.

In a particular embodiment, contacts $206_{(6)}$ and $206_{(7)}$ may form a second pair of data pins (DP2/DN2) and can each be configured to carry one or more of a variety of signals, such as (a) USB differential data signals, (b) non-USB differential data signal, (c) UART transmit signal, (d) UART receive signal, (e) digital debug input/output signals, (f) a debug clock signal, (g) audio signals, (h) video signals, etc.

In a particular embodiment, contact $206_{(8)}$ may be a ground pin or otherwise provided at a voltage potential lower than contacts $206_{(1)}$, $206_{(4)}$, and $206_{(5)}$ so as to provide a voltage potential for power being provided to or from the host device.

In some embodiments, tab 104 has a 180 degree symmetrical, double orientation design which enables plug connector 100 (or connector 101) to be inserted into receptacle 200 in both a first orientation and a second orientation. FIGS. 3A and 3B are schematic views illustrating the different orientations that connector 100 (or connector 101) can be mated with connector 200. As illustrated in FIG. 3A, connector 100 (or connector 101) can be mated with connector 200 where contacts 112 of connector 100 (or connector 101) can couple with contacts 206 of connector 200. We can refer to this as the first orientation for purposes of explanation. Details of several particular embodiments of connector 100 (and connector 101) are described in a commonly-owned U.S. patent application Ser. No. 13/607,366, filed on Sep. 7, 2012, the contents of which are incorporated by reference herein in their entirety for all purposes.

FIGS. 2D and 2E illustrate pin-out configuration for a receptacle connector according to two different embodiments of the present invention. In one embodiment, receptacle connector 200 has a pin-out as shown in FIG. 2E that matches pin-out of connector 100 in FIG. 1D and in another embodiment receptacle connector 200 has a pin-out as shown in FIG. 2F that matches pin-out of connector 101 of FIG. 1E. In each of FIGS. 2D and 2E, the ACC1 and ACC2 pins are configured to mate with either the accessory power (ACC_PWR) or accessory ID (ACC_ID) pins of the plug connector depending on the insertion orientation of plug connector, the pair of Data A contacts is configured to mate with either the pair of Data 1 contacts or the pair of Data 2 contacts of the plug connector, and the P_IN (power in) pin or pins are configured to mate with the Host Power contact or contacts of the plug connector. Additionally, in the pin-out of FIG. 2E, the GND contact is configured to mate with the GND contact in the plug connector.

Figure 3:
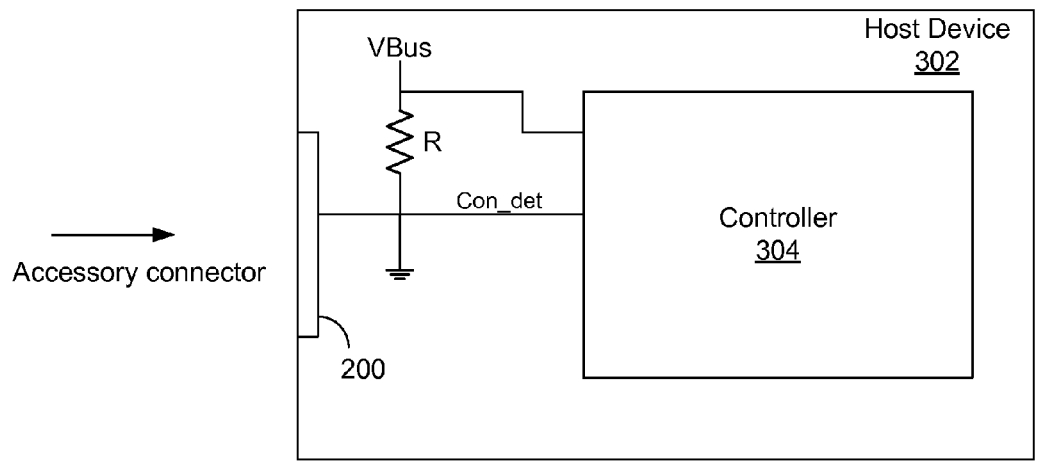
FIG. 3 illustrates a mechanism to detect the physical connection using detection contacts in a receptacle connector, according to an embodiment of the present invention.
Figure 3:
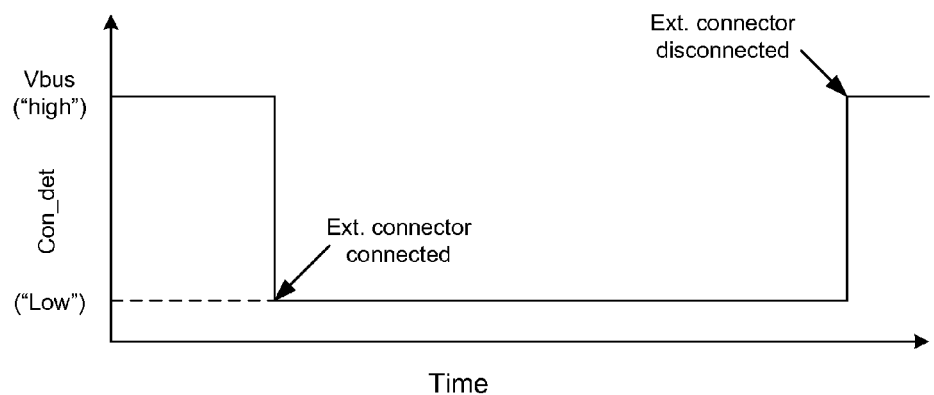

Returning to FIG. 2B, as described above, contacts $208_{(1)}$ and $208_{(2)}$ in the receptacle connector may be used to detect physical connection between plug connector 100 and receptacle connector 200. FIG. 3 illustrates a mechanism to detect the physical connection using contacts $208_{(1)}$ and $208_{(2)}$ in the receptacle connector, according to an embodiment of the present invention.

Receptacle connector 200 of host device 302 may have two connection detection contacts $208_{(1)}$ and $208_{(2)}$ disposed in the cavity. One or both of these contacts may be connected to a constant DC bias voltage, VBus, via resistor R. The VBus may be provided by a controller 304 of host device 302. In an embodiment, the voltage value provided by the VBus may be between 3 V and 5 V. Thus, in a default state when plug connector is not connected to receptacle connector 200, the connection detection contacts are held at a voltage characterized by VBus. In other words, the connection detection contacts are held at logic "high" or "1" in their default state. When the plug connector is inserted into receptacle connector 200 of host device 302, the ground ring of the plug connector (e.g., ground ring 120 as illustrated in FIG. 1A) makes physical contact with contacts $208_{(1)}$ and $208_{(2)}$. This causes the VBus voltage to be connected to the ground and results in the voltage on contacts $208_{(1)}$ and $208_{(2)}$ (i.e. the con_det line) to drop to a value significantly lower than the default value. In a particular embodiment, the voltage level at contacts $208_{(1)}$ and $208_{(2)}$ drops to between 0.1 V and 2.5 V, which can be characterized as a logic "low" or "0." Controller 304 in the host device can detect this change in voltage level at contacts $208_{(1)}$ and $208_{(2)}$ and conclude that plug connector 100 is adequately mated with receptacle connector 200 and may, as a result, initiate the electrical communication between the accessory and the host device.

In some embodiments, contacts $208_{(1)}$ and $208_{(2)}$ are physically recessed from the other contacts $206_{(1)}$-$206_{(N)}$ in receptacle connector 200 such that contacts $208_{(1)}$ and $208_{(2)}$ are physically the last contacts to be engaged by the plug connector and the first contacts to be disengaged when the plug connector is unmated from the receptacle connector. In other words, contacts $208_{(1)}$ and $208_{(2)}$ are the last connect-first disconnect type contacts.

In some embodiments, where the contacts are spaced very close to each other, e.g., as illustrated in FIG. 2A or FIG. 1A, having a constant voltage bias on one or more contacts may lead to dendrite growth over and around the contact, which may lead to failure of the connector over a period of time. Dendrite growth is a well-known phenomenon in the industry and as such explanation of this phenomenon is omitted here for sake of brevity. Also, if there is a constant DC voltage present on a contact of a connector there is a risk that if there is some sort of liquid ingress or entry of other contaminants in the connector, there may be possibility of shock or other electrical hazard due to the ever present voltage on the contact, which may be shorted to the ground by the liquid/contaminants. This is especially true in case of contacts that are exposed to the environment as in the case of connector 100 (or 101) described above.

Figure 4:
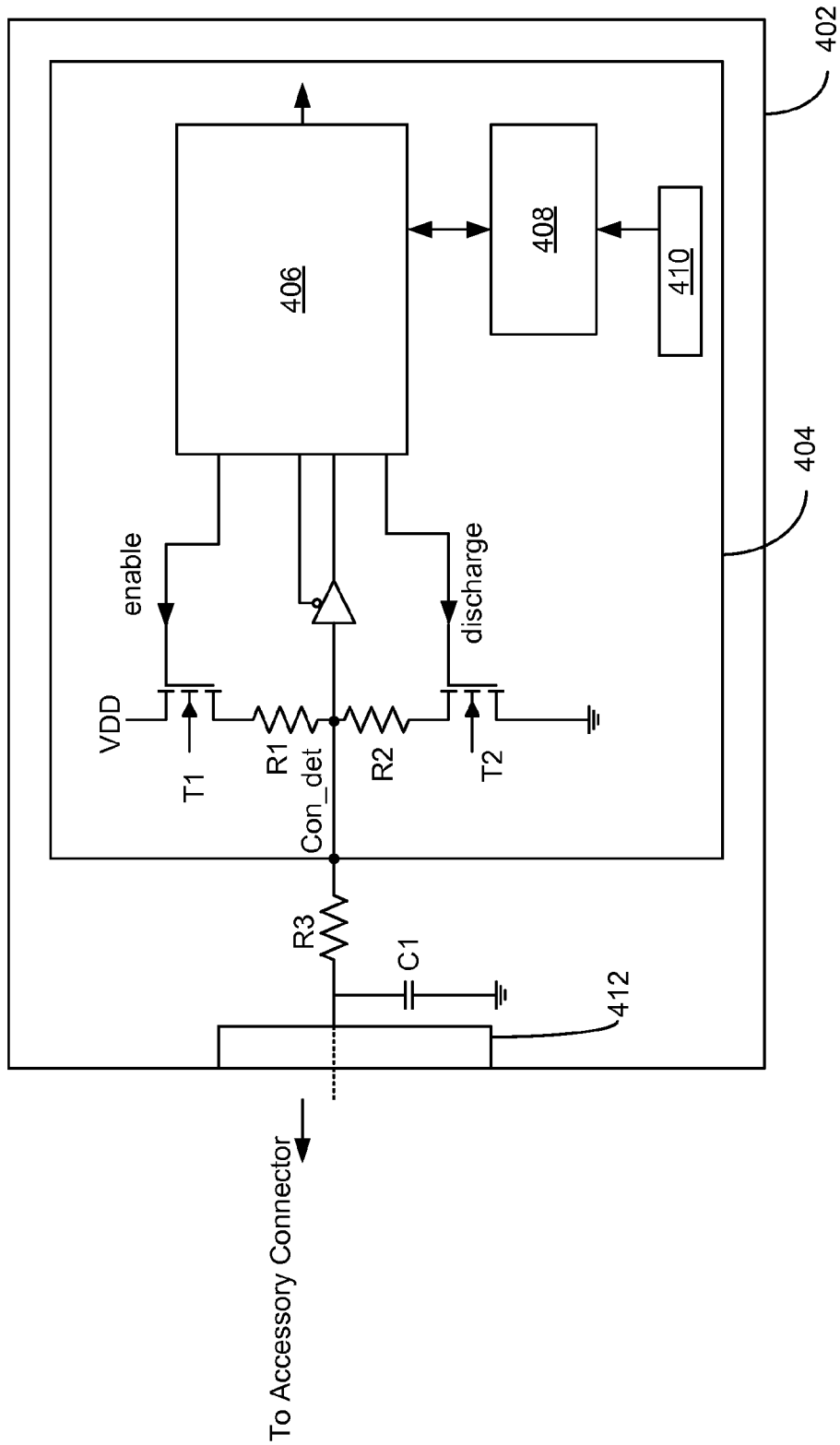
FIG. 4 illustrates a schematic that may be used to detect physical connection and disconnection between two connectors according to another embodiment of the present invention.

One way to overcome this potential issue is to incorporate mechanisms to prevent/reduce growth of dendrites on the contacts. FIG. 4 illustrates a schematic that may be used to detect physical connection between two connectors while preventing/reducing growth of dendrites according to an embodiment of the present invention.

As illustrated in FIG. 4, a host device 402 can include circuitry 404 that may be used to detect connection of a plug connector with a receptacle connecter of host device 402. In an embodiment, circuitry 404 may include discrete components. In other embodiments, circuitry 404 may be implemented as a single integrated circuit (IC) chip. Circuitry 404 includes a controller 406 that controls the operation of circuitry 404, a pulse generator 408 that can generate a programmable pulse signal in conjunction with an oscillator 410. Circuitry 404 is coupled to one or both the connection detection contacts of a connector 412 associated with the host device, e.g., connector 200 of FIG. 2A. A voltage divider circuit comprising of resistors R1 and R2 can provide a known voltage at the connection detection contacts. Transistors T1 and T2 can be used to charge the connection detection ("Con_det") line up to the bias voltage (e.g., VDD) and/or discharge the connection detection line to ground or some other predefined low voltage level, respectively. In some embodiments, bias voltage VDD can range between 1V and NV. Resistor R3 is coupled to the connection detection contact in order to provide protection against unexpected voltage spikes. In some embodiments, resistor R3 may have a value of between 1 KΩ and 10 KΩ Capacitor C1 represents the line/parasitic capacitance of the connection detection line. Value of capacitor C1 may depend on the design of the connector and may vary between 1 pF and 100 μF. It is to be noted that host device 402 may include other circuitry or components that are not specifically disclosed herein.

Figure 5:
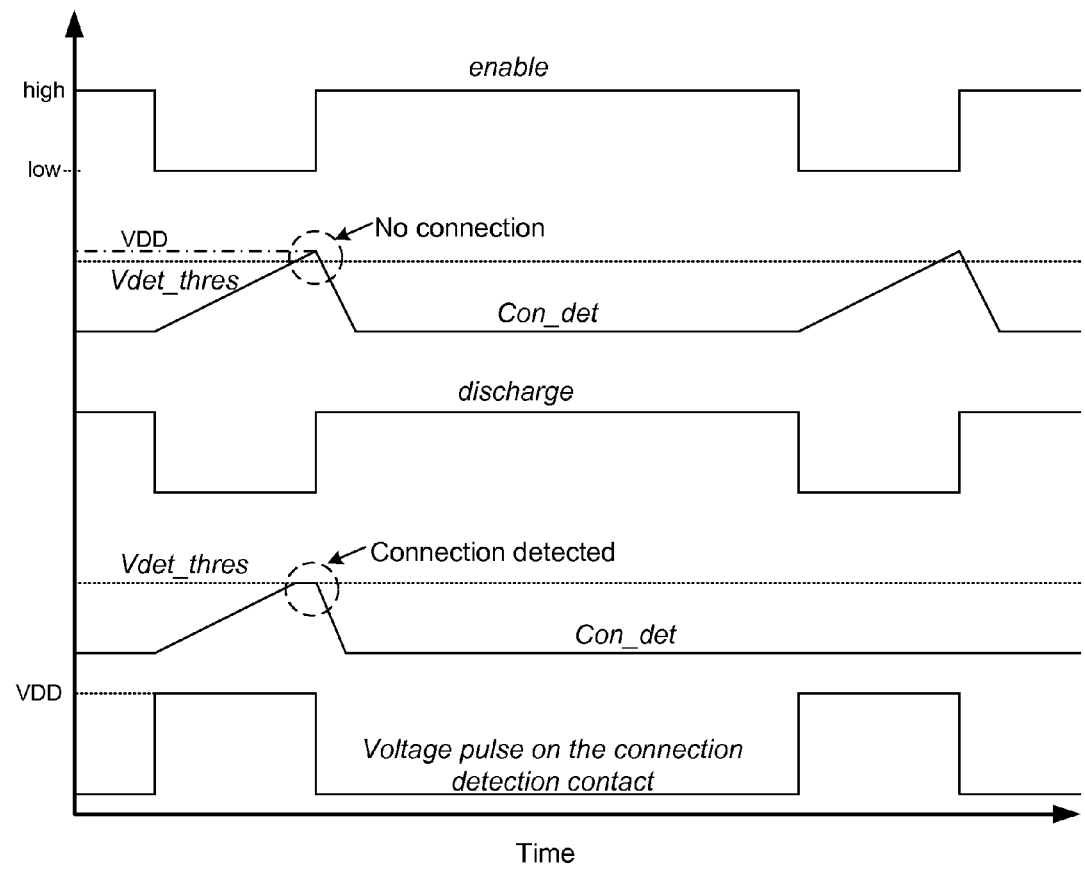
FIG. 5 is a graph that illustrates various signals used in operation of detection circuitry in a host device during a connection and disconnection detection operations, according to an embodiment of the present invention.

FIG. 5 is a graph that illustrates operation of circuitry 404 during a connection detection operation. The following description of the process of connection detection is provided with reference to FIGS. 4 and 5.

When host device 402 is powered up, it may go through an initialization process in which several of the components of the host device may be enabled for operation and placed in a ready state. Once the host device is ready for operation, pulse generator 408 may generate a signal that is used to trigger application of a voltage on the connection detection contact via transistor T1. This signal is represented as the "enable" signal in FIGS. 4 and 5. The enable signal may be have a very small duty cycle, e.g., 0.1% to 1%. In some embodiments, the frequency of the enable signal may be between 1 Hz to 100 Hz. Whenever the enable signal is activated, it results in turning on transistor T1 and the VDD voltage is provided on the connection detection contact. In some embodiments, the VDD voltage may be between 3 V and 5 V DC. Thus, in one embodiment, the VDD may be applied to the connection detection contact in a pulsed manner for 1 ms duration with a duty cycle of between 0.1% and 1%. In an embodiment, when the enable signal transitions from a logic 'high' to a logic 'low', transistor T1 is turned on so that the VDD voltage is provided on the connection detection contacts. During the time the enable signal is in the logic low state, circuitry 404 looks for indication of connection of an accessory or plug connector to the receptacle connector of host device 402.

A voltage threshold Vdet_thres signal, as illustrated in FIG. 5, may be defined in order to detect connection of a plug connector. Vdet_thres is the voltage that may not be exceeded as measured on the connection detection contact if a plug connector is connected to the receptacle connector regardless of the value of VDD applied to the connection detection contact. In other words, if a plug connector is connected to the receptacle connector, the voltage on the connection detection contact may not exceed the Vdet_thres value regardless of the value of the VDD. For example, if the VDD is 3 V, Vdet_thres can be some value lower than 3 V, e.g., 1.5 V. Vdet_thres can be defined based on the design of the connectors, the host device, and/or the accessory and can be any suitable value based on the application. If there is no plug connector physically connected to the receptacle connector of host device 402, then as soon as the VDD is enabled, the voltage on the connection detection contact starts to rise. This is illustrated in FIG. 5 as the con_det signal. Circuitry 404 monitors this voltage rise. If the voltage on the connection detection contact exceeds the Vdet_thres value during the time that the VDD is applied to the connection detection contact (i.e. the enable signal is in a logic 'low' state), circuitry 404 determines that there is no plug connector connected to the host device connector. Based on that conclusion and after expiration of the time associated with the duty cycle of the enable signal, circuitry 404 turns off transistor T1 (i.e. the enable signal transitions to logic 'high' state as illustrated in FIG. 5) to terminate the VDD on the connection detection contact and turns on transistor T2 to actively drive down the voltage on the connection detection contact to zero or near ground level. The active discharge may be needed since the capacitance C1 of the connection detection line may accumulate charge when VDD is applied and may retain some of the charge even after the VDD is terminated. If this charge is not dissipated, the connection detection line may not reach the zero or near zero level and may result in false readings that a plug connector is connected when in fact there is no plug connector connected to the receptacle connector. The discharging of the connection detection line is illustrated by the "discharge" signal in FIG. 5. For example, the turning on of transistor T2 is illustrated by the discharge signal transitioning from logic 'low' to a logic 'high' state in FIG. 5.

Consider that a plug connector (e.g., connector 100 of FIG. 1A) is physically mated to the connector of host device 402 (i.e. the connection detection contact is now connected to some portion of the plug connector. In this instance, when the enable signal is activated, it applies the VDD voltage to the connection detection contact, but since now the connection detection contact is not floating but rather connected to some portion (e.g., the ground ring) of the plug connector, the voltage on the connection detection contact starts to rise but does not exceed the Vdet_thres value. If circuitry 404 detects that the voltage on the connection detection contact does not exceed the Vdet_thres value during the time VDD is applied to the connection detection contact, the host device can conclude that a plug connector has been physically mated with the connector of host device 402. In some embodiments, circuitry 404 may monitor the connection detection contact for an additional time period in order to ensure that the voltage on the con_det line does not exceed the Vdet_thres value to ensure that there indeed is a plug connector present and the reading was not a mere 'false alarm." This extra time can be referred to as debounce time.

Once it is concluded that a plug connector is connected, a constant voltage is applied to the connection detection contact via transistor T1 and the voltage divider circuit. In other words, the con_det signal stays in the logic low state until such time as the plug connector remains physically connected to the connector of host device 402. This is also illustrated in FIG. 5.

In a disconnection event, i.e. when the plug connector is physically disconnected from the receptacle connector of host device 402, the voltage on the con_det line again rises above the Vdet_thres level. This informs circuitry 404 that the plug connector has been physically unmated from the receptacle connector. Circuitry 404 then enables transistor T2 and disables transistor T1 to actively discharge the voltage on the connection detection contacts to zero or near zero level. Thereafter the process may start again where circuitry 404 periodically applies voltage on the connection detection contact to look for presence of a plug connector. In some embodiments, circuitry 404 may apply the VDD on the connection detection contact for a time period corresponding to the duty cycle of the enable signal and if no plug connector is detected, discharge the voltage and repeat the process.

Figure 6:
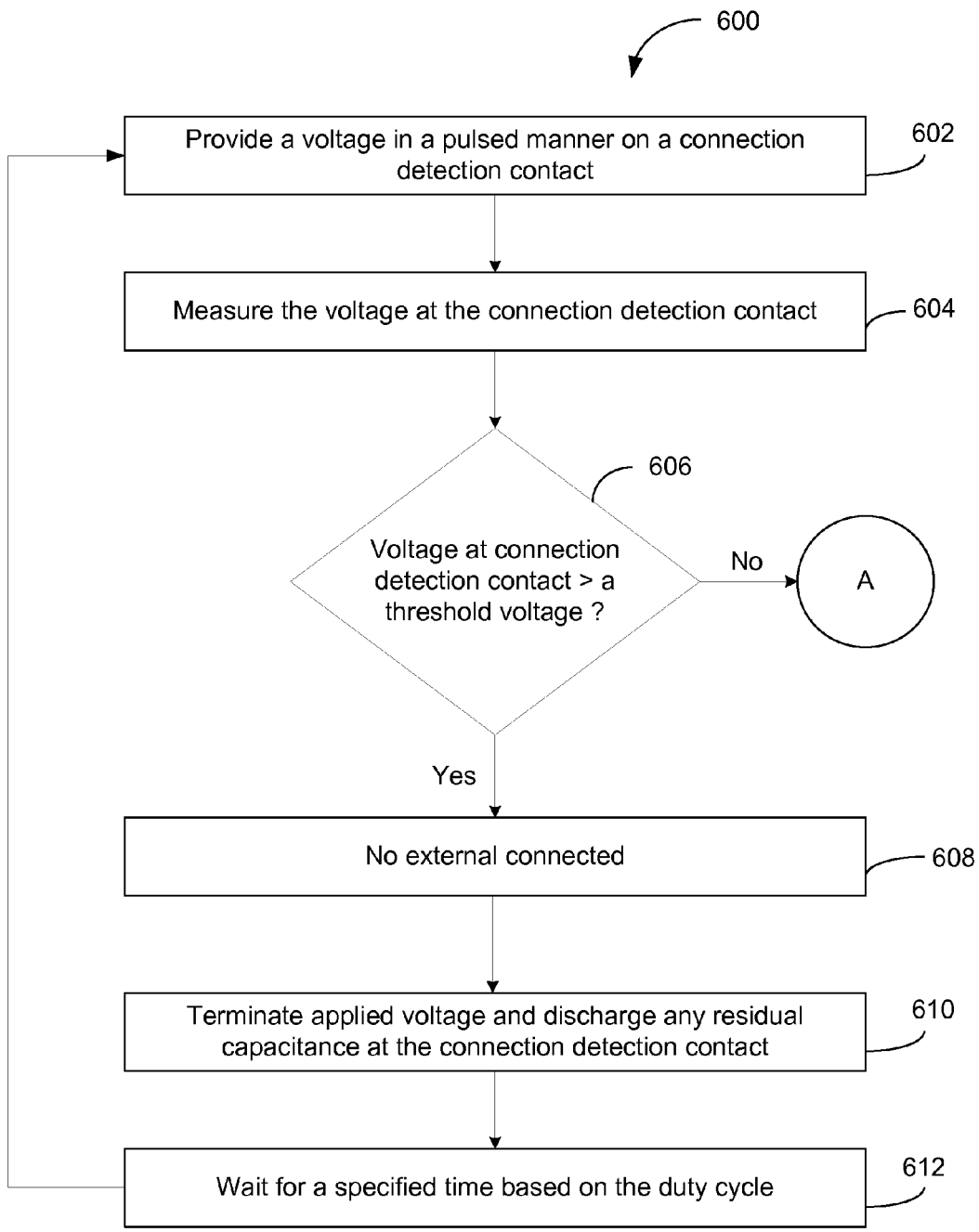
FIG. 6 is a flow diagram of a process for detecting physical connection and disconnection of two connectors according to an embodiment of the present invention.

FIG. 6 is a flow diagram of a process 600 for detecting connection of a plug connector to a receptacle connector according to an embodiment of the present invention. Process 600 can be performed, e.g., by host device 402 of FIG. 4. At block 602, the host device can provide a voltage on a connection detection contact of the receptacle connector associated with the host device. As described above, the voltage can be provided as a pulse having amplitude and a frequency. At block 604, the host device measures the voltage at the connection detection contacts. At block 606, the host device detects whether the voltage on the connection detection contact has exceeded a threshold voltage during the time that the voltage pulse is applied to the connection detection contact. If it is determined that the voltage on the connection detection contact has exceeded the threshold voltage, then at block 608, the host device can conclude that there is no plug connected to the receptacle connector. Based on this determination, the host device can terminate the applied voltage on the connection detection contact and couple the connection detection contact to a ground path in order to rapidly discharge any built up capacitance in the connection detection line, at block 610. The host device can then wait for a specified period of time based on the duty cycle of the voltage signal (block 612). Thereafter process 600 returns to block 602.

If at block 606, the host device determines that the voltage on the connection detection contact has not exceeded the threshold voltage during the time that the voltage is applied to the connection detection contact, and then at block 614, the host device determines that a plug connector is physically mated with the receptacle connector. Thereafter, at block 616, the host device applies a constant pull-up voltage at the connection detection contact so that the connection detection line remains in a logic 'low' state indicating connection with a receptacle connector. The connection detection line remains in the 'low' state until the plug connector is physically unmated from the receptacle connector. When the plug connector is physically unmated from the receptacle connector, the connection detection line transitions to a logic 'high' state and the voltage at the connection detection contact exceeds the threshold voltage (block 618). Upon detecting that the voltage at the connection detection contact has exceeded the threshold voltage, the host device concludes that the plug connector is unmated from the receptacle connector and terminates the voltage on the connection detection contact (block 620) and dissipates any accumulated capacitance on the connection detection line. Process 600 may then return to block 602.

It should be appreciated that the specific steps illustrated in FIG. 6 provide a particular method of detecting connection and disconnection of connector according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
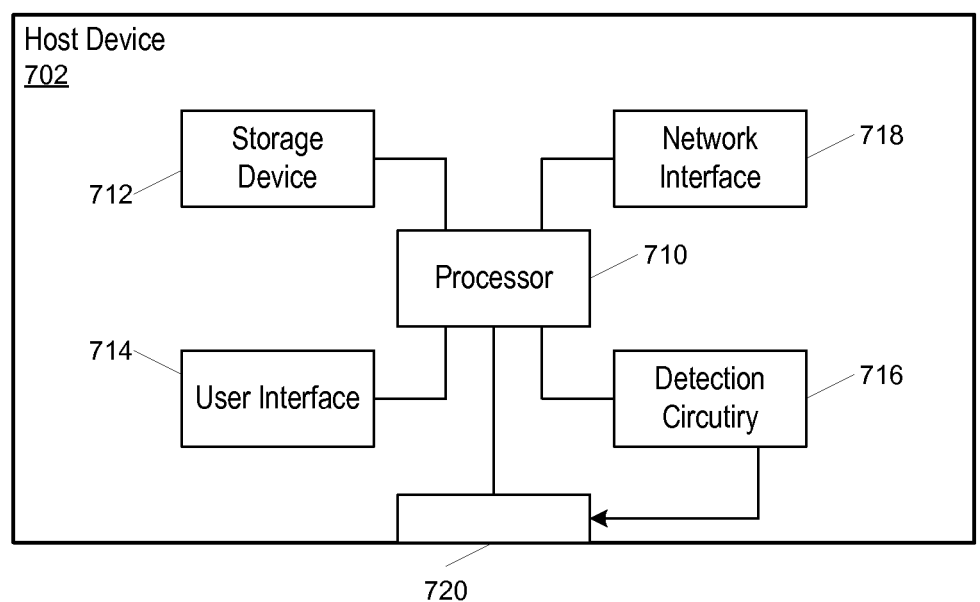
FIG. 7 is a high-level functional block diagram of a host device according to an embodiment of the present invention.

FIG. 7 is a functional block diagram of a host device 702 according to an embodiment of the present invention. Host device 700 may be implemented as host device 402 of FIG. 4.

Host device 702 (e.g., implementing host device 402 of FIG. 4) can provide computing, communication and/or media playback capability. Host device 702 can include a processor 710, storage device 712, user interface 714, detection circuitry 716, network interface 718, and accessory input/output (I/O) interface 720. Host device 702 can also include other components (not explicitly shown) to provide various enhanced capabilities.

Storage device 712 can be implemented, e.g., using disk, flash memory, or any other non-transitory or nonvolatile storage medium. In some embodiments, storage device 712 can store media assets such as audio, video, still images, or the like, that can be played by host device 702. Storage device 712 can also store other information such as a user's contacts (names, addresses, phone numbers, etc.); scheduled appointments and events; notes; and/or other personal information. In some embodiments, storage device 712 can store one or more application programs to be executed by processor 710 (e.g., video game programs, personal information management programs, media playback programs, etc.). In a particular embodiment, storage device 712 can store instruction that enable host device 702 to detect connection and disconnection of an external connector.

User interface 714 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 714 to invoke the functionality of host device 702 and can view and/or hear output from host device 702 via output devices of user interface 714.

Processor 710, which can be implemented as one or more integrated circuits (e.g., a conventional microprocessor or microcontroller), can control the operation of host device 702. In some embodiments, single-core processors, multi-core processors, and/or multi-processor systems may be implemented. In various embodiments, processor 710 can execute a variety of programs in response to program code and can maintain multiple concurrently executing programs or processes. At any given time, some or all of the program code to be executed can be resident in processor 710 and/or in storage media such as storage device 712. Processor 710 can also operate other programs to control other functions of host device 602. In some embodiments, processor 710 in conjunction with circuitry 716 can determine connection and disconnection of an external connector with host device 702.

Circuitry 716 provides capability for detecting physical mating of a connector, e.g., accessory-side connector with a connector of host device 702. In some embodiments, circuitry 716 can implement circuitry 404 of FIG. 4. In some embodiments, circuitry 716 can be implemented as a single Application Specific Integrated Circuit (ASIC).

Network interface 718 can provide voice and/or data communication capability for host device 702. In some embodiments, network interface 718 can include radio frequency (RF) transceiver components for accessing wireless voice and/or data networks (e.g., using cellular telephone technology, advanced data network technology such as 3G, EDGE, or 4G (e.g., LTE network), WiFi (IEEE 802.11 family standards), or other mobile communication technologies, or any combination thereof), GPS receiver components, and/or other components. In some embodiments, network interface 718 can provide wired network connectivity (e.g., Ethernet) in addition to or instead of a wireless interface. Network interface 618 can be implemented using a combination of hardware (e.g., antennas, modulators/demodulators, encoders/decoders, and other analog and/or digital signal processing circuits) and software components.

Accessory I/O interface 720 can allow host device 702 to communicate with various accessories. For example, accessory I/O interface 720 can support connections to an adapter, a computer, an external speaker dock or media playback station, a digital camera, a radio tuner (e.g., FM, AM and/or satellite), an in-vehicle entertainment system, an external video device, card reader, disc reader, or the like.

In some embodiments, accessory I/O interface 720 can include a receptacle connector, such as a connector 200 as illustrated in FIG. 2A, as well as supporting circuitry for the connector. The connector can provide connections for power, ground, connection detection for external connectors, as well as for various wired communication interfaces such as Universal Serial Bus (USB), FireWire (IEEE 1394 standard), and/or universal asynchronous receiver/transmitter (UART). The connector can also provide connections for audio and/or video signals, which may be transmitted to or from host device 702 in analog and/or digital formats. Thus, accessory I/O interface 720 can support multiple communication channels, and a given accessory can use any or all of these channels. In some embodiments, accessory I/O interface 720 can include the 30-pin connector or the Lightning® connecter manufactured by Apple Inc. In some embodiments, accessory I/O interface 720 is a receptacle connector (e.g., connector 200 of FIG. 2A) that is capable of accepting a corresponding plug connector (e.g., connector 100 of FIG. 1A).

Several advantages are realized by the techniques disclosed herein. By using a pulsed voltage to detect connection of an accessory reduces the amount of time a voltage bias is present on any contacts of the host device connector. This reduces the likelihood of corrosion of the contacts, such as dendrite growth, that may be caused by a constant voltage bias. The duty cycle of the voltage pulse can be varied such that even when the voltage is present on the connection detection contacts of the host connector, the time for which the voltage is applied is small enough to reduce/eliminate growth of dendrites and thereby limit corrosion of contacts making the contacts more reliable over extended length of their operation.

It will be appreciated that the system configurations and components described above are illustrative and that variations and modifications are possible. Host device 702 may have other capabilities not specifically described herein (e.g., mobile phone, global positioning system (GPS), broadband data communication, Internet connectivity, etc.).

Circuits, logic modules, processors, and/or other components can be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various non-transitory computer readable storage media; suitable media include magnetic disk or tape, optical storage media, such as compact disk (CD) or DVD (digital versatile disk), flash memory, and the like. Computer readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. A method for detecting when a first connector is mated with a second connector, the method comprising:
   providing, by a host device, a voltage pulse characterized by an ON time and an OFF time at a first contact of the first connector, wherein the ON time of the voltage pulse is initiated by an enable signal turning on a first transistor and the OFF time is initiated by the enable signal turning off the first transistor and a discharge signal turning on a second transistor and wherein when the first connector is not mated with another connector the voltage pulse transitions from a first voltage to a second voltage during the ON time and transitions from the second voltage to the first voltage during the OFF time;
   setting a threshold voltage at a voltage level between the first and second voltages;
   during the ON time, comparing, by the host device, the voltage pulse at the first contact to the threshold voltage;
   determining, by the host device, that the first connector is mated with the second connector if the voltage of the voltage pulse does not exceed the threshold voltage during the ON time.

2. The method of claim 1 wherein the voltage pulse is triggered by an enable signal having a duty cycle in the range of about 0.1% to 1%.

3. The method of claim 1 wherein the second voltage is between 3 V and 5 V.

4. The method of claim 1 wherein the ON time is about 1 millisecond.

5. The method of claim 1 wherein the voltage pulse is triggered by an enable signal having a frequency of between 1 Hz and 100 Hz.

6. The method of claim 1 further comprising setting a voltage at the first contact to the first voltage level upon determining that the first connector is mated with the second connector.

7. The method of claim 6 further comprising:
   after setting the voltage at the first contact to the first voltage level, determining, by the host device, that the second connector is disconnected from the first connector if the voltage at the first contact increases to exceed the threshold voltage.

8. A host device comprising:
   a first connector having a plurality of contacts and configured to mate with a second connector of an accessory device;
   a processor coupled to the first connector; and
   detection circuitry coupled to the processor and the first connector, wherein the detection circuitry in conjunction with the processor is configured to:
   output a voltage pulse over a first contact of the first connector, the voltage pulse characterized by an ON time and an OFF time, wherein the ON time of the voltage pulse is initiated by an enable signal turning on a first transistor and the OFF time is initiated by the enable signal turning off the first transistor and a discharge signal turning on a second transistor and wherein when the first connector is not mated with another connector the voltage pulse transitions from a first voltage to a second voltage during the ON time and transitions from the second voltage to the first voltage during the OFF time;
   set a threshold voltage at a voltage level between the first and second voltages;
   during the ON time, compare the voltage pulse to the threshold voltage;
   and
   if the voltage of the voltage pulse does not exceed to the threshold voltage during the ON time, concluding that the second connector is connected to the first connector.

9. The host device of claim 8 wherein if it is concluded that the second connector is connected to the first connector, the detection circuitry in conjunction with the processor is further configured to set the voltage at the first contact to the first voltage level.

10. The host device of claim 8 wherein the detection circuitry in conjunction with the processor is further configured to, after setting the voltage at the first contact to the first voltage level:
    compare the voltage at the first contact to the threshold level, and if the voltage at the first contact exceeds the threshold voltage determine that the second connector is disconnected from the first connector, and discharge capacitance at the first contact by coupling the first contact to ground.

11. The host device of claim 8 wherein the detection circuitry is implemented in a single integrated circuit (IC) chip.

12. The host device of claim 8 wherein the voltage pulse is triggered by an enable signal having a duty cycle ranging between 0.1% and 1%.

13. A non-transitory computer-readable storage device including a plurality of instructions, which when executed by a processor in a host device, cause the processor to perform a method for detecting mating and un-mating of a first connector of the host device with a second connector of an accessory device, the plurality of instructions comprising:
    instructions that cause the processor to provide a voltage pulse characterized by an ON time and an OFF time at a first contact of the first connector, wherein the ON time of the voltage pulse is initiated by an enable signal turning on a first transistor and the OFF time is initiated by the enable signal turning off the first transistor and a discharge signal turning on a second transistor and wherein when the first connector is not mated with another connector the voltage pulse transitions from a first voltage to a second voltage during the ON time and transitions from the second voltage to the first voltage during the OFF time;
    instructions that cause the processor to set a threshold voltage at a voltage level between the first and second voltages;
    instructions that cause the processor to measure a first voltage at the first contact;
    instructions that cause the processor to compare the voltage pulse to the threshold voltage during the ON time; and instructions that cause the processor to determine that the second connector is connected to the first connector if the voltage of the voltage pulse does not exceed the threshold voltage during the ON time.

14. The computer-readable storage device of claim 13 wherein the plurality of instructions further comprise:

instructions that, after determining that the second connector is connected to the first connector, set a voltage at the first contact to the first voltage level, and enable the processor to detect if the voltage at the first contact subsequently exceeds the threshold voltage; and if the voltage at the first contact exceeds the threshold voltage, instructions that cause the processor to conclude that the second connector is disconnected from the first connector, terminate the voltage at the first contact, and discharge the capacitance at the first contact by coupling the first contact to ground.

15. The computer-readable storage device of claim 13 wherein the voltage pulse is triggered by an enable signal having a frequency between 1 Hz and 100 Hz.

16. The computer-readable storage device of claim 13 wherein the ON time and OFF time together define a duty cycle and wherein the duty cycle is between 0.1% and 1%.

17. The computer-readable storage device of claim 13 wherein the second voltage is between 3 V and 5 V.

* * * * *